(12) United States Patent
Yamawaki

(10) Patent No.: US 6,920,733 B2
(45) Date of Patent: Jul. 26, 2005

(54) UNFOLDABLE CONNECTED STRUCTURE AND METHOD FOR UNFOLDING THE SAME

(75) Inventor: Koji Yamawaki, Tsukuba (JP)

(73) Assignee: Japan Aerospace Exploration Agency, Tsukuba (JP)

( * ) Notice: Subject to any disclaimer, the term of this patent is extended or adjusted under 35 U.S.C. 154(b) by 0 days.

(21) Appl. No.: 10/348,773

(22) Filed: Jan. 23, 2003

(65) Prior Publication Data

US 2003/0140589 A1 Jul. 31, 2003

(30) Foreign Application Priority Data

Jan. 25, 2002 (JP) ....................................... 2002-017033

(51) Int. Cl.[7] ............................................ E04H 12/00
(52) U.S. Cl. ..................................... 52/648.1; 52/655.1
(58) Field of Search .............................. 52/648.1, 81.1, 52/655.1, DIG. 10

(56) References Cited

U.S. PATENT DOCUMENTS

| | | | | |
|---|---|---|---|---|
| 1,984,767 A | * | 12/1934 | Shaffert ..................... | 52/648.1 |
| 3,521,421 A | * | 7/1970 | Schroeder, Jr. ............ | 52/648.1 |
| 3,838,703 A | | 10/1974 | Zeigler | |
| 4,555,585 A | | 11/1985 | Behrens et al. | |
| 5,224,320 A | * | 7/1993 | Mai .......................... | 52/648.1 |
| 5,430,989 A | * | 7/1995 | Jones ........................ | 52/655.1 |
| 5,499,882 A | * | 3/1996 | Waterhouse ................ | 403/171 |

FOREIGN PATENT DOCUMENTS

| | | |
|---|---|---|
| JP | 61-109207 | 7/1986 |
| JP | 62-015904 | 1/1987 |
| JP | 62029206 | 2/1987 |
| JP | 08186424 | 7/1996 |

OTHER PUBLICATIONS

Patent Abstracts of Japan, vol. 0111, No. 87 (E–516), Jun. 16, 1987.

* cited by examiner

*Primary Examiner*—Peter M. Cuomo
*Assistant Examiner*—Stephen Vu
(74) *Attorney, Agent, or Firm*—Jacobson Holman PLLC

(57) ABSTRACT

An unfoldable connected structure has a structural unit movable in a folded and an unfolded state. The structural unit includes five arm units, and each of the arm units include an inner arm member having first and second ends, an outer arm member having first and second ends, an elbow joint mechanism movably connecting the first end of the inner arm member to the first end of the outer arm member, a shoulder joint mechanism movably connected to the second end of the inner arm member, and a wrist joint mechanism movably connected to the second end of the outer arm member; and means for connecting the arm units radially through their respective shoulder joint mechanism to form a frame of a pentagonal pyramid configuration when the structural unit is in an unfolded state. The unfoldable connected structure forms no void at its outer surface when it is in an unfolded state, has improved structural strength, and allows smooth folding and unfolding action.

8 Claims, 13 Drawing Sheets

UNFOLDABLE CONNECTED STRUCTURE AND METHOD FOR UNFOLDING THE SAME

BACKGROUND OF THE INVENTION

1. Field of the Invention

The present invention relates to an unfoldable connected structure and a method for unfolding such structure for constructing a large space structure by unfolding the structure in aerospace.

2. Description of Prior Art

In the past, in order to construct a large structure such as a space station or a solar battery structure for an electric propulsion spacecraft in the aerospace, works done by astronauts outside a spaceship have been inevitable, or developments for intelligent robots have been desired. However, for manned spacecraft, it is required to train the astronauts for a long time, and there is always a life at risk. As for intelligent robots, there is a problem of high development cost. As a result, recently, developments have been made for methods for constructing large space structures by using unfoldable connected structures which can be transported to aerospace in their folded states and unfolded in aerospace by driving force of a motor.

One example of such unfoldable connected structures is disclosed in Japanese patent un-examined publication (JP Kokai) No. 2001-132893. In this example, the unfoldable connected structure is obtained by connecting twenty structural units of equilateral hexagon to form a spheric shell structure.

However, the unfoldable connected structure described in JP Kokai No. 2001-132893 has twelve pentagonal voids when the twenty structural are connected to form the spheric shell structure. Therefore, it is difficult to improve the structural strength of this unfoldable connected structure.

SUMMARY OF THE INVENTION

Accordingly, it is an object of the present invention to solve the problems just described. The present invention provides an unfoldable connected structure which forms no void at its outer surface when it is in an unfolded state, has improved structural strength, and allows smooth folding and unfolding action.

The present invention is an unfoldable connected structure having a structural unit movable in a folded and an unfolded state, the structural unit including five arm units, each of the arm units including an inner arm member having first and second ends, an outer arm member having first and second ends, an elbow joint mechanism movably connecting the first end of the inner arm member to the first end of the outer arm member, a shoulder joint mechanism movably connected to the second end of the inner arm member, and a wrist joint mechanism movably connected to the second end of the outer arm member; and means for connecting the arm units radially through their respective shoulder joint mechanism to form a frame of a pentagonal pyramid configuration when the structural unit is in an unfolded state.

Preferably, the present invention further has an extension mechanism for setting an elbow joint angle between the inner arm member and the outer arm member to 180°; a rotation mechanism for setting a connection angle of the structural unit to a predetermined angle; a wire spanned between the shoulder joint mechanism and the wrist joint mechanism; and a wire-adjusting mechanism for adjusting a length of the wire between the shoulder joint mechanism and the wrist joint mechanism.

The present invention may further have an inner membranous member provided between the inner arm members adjacent to each other; an outer membranous member provided between the outer arm members adjacent to each other; and the inner and the outer membranous members being unfolded as the structural unit is unfolded and being spread between the inner and the outer arm members.

The present invention may further have a connecting arm unit containing a left arm member having first and second ends, a right arm member having first and second ends, an elbow joint mechanism movably connecting the first end of the left arm member to the first end of the right arm member, a left connecting mechanism movably connecting the second end of the left arm member to the wrist joint mechanism connected to the second end of the outer arm member of one of the five arm units, and a right connecting mechanism movably connecting the second end of the right arm member to the wrist joint mechanism connected to the second end of the outer arm member of another arm units adjacent to the one arm unit.

In this regard, the connecting arm unit may further have an extension mechanism provided to the elbow joint mechanism for setting an elbow joint angle between the inner arm member and the outer arm member to 180°; a rotation mechanism for setting a connection angle of the left connecting mechanism and the right connecting mechanism to a predetermined angle; a wire spanned between the left connecting mechanism and the right connecting mechanism; and a wire-adjusting mechanism for adjusting a length of the wire between the left connecting mechanism and the right connecting mechanism.

In addition, the structural unit may have a sweptback angle of about 10°.

Furthermore, the present invention may have twelve of the structural units connected, and forming a shell-shape dodecahedron.

Yet further, the present invention may further have additional structural units radially connected in five directions to the structural unit disposed in the center; when the unfoldable connected structure is folded, the connection angle between each of the structural units being set to 180°; and when the unfoldable connected structure is unfolded, the connection angle being set to 116.565°.

The present invention is also a method for unfolding the unfoldable connected structure set out in claim 8, the method comprising the steps of while maintaining each of the elbow angles of the arm unit and the connecting arm unit being set as 0°, changing the connection angle between each of the structural units from 180° to 116.565°, followed by connecting all unconnected parts between the wrist joint mechanism and the left connecting mechanism or the right connecting mechanism; and while maintaining the connecting angle as 116.565°, changing each of the elbow angles of the arm unit and the connecting arm unit from 0° to 180°.

Preferably, in the present invention, the connection angle between each of the structural units and each of the elbow angles of the arm unit and the connecting arm unit are changed sequentially from the structural unit close to the center to form a shell-shape dodecahedron.

With these features, the present invention provides an unfoldable connected structure which forms no void at its outer surface when it is in an unfolded state, has improved structural strength, and allows smooth folding and unfolding action.

DESCRIPTION OF THE PREFERRED EMBODIMENT

With referring the drawings, embodiments of the present invention will be explained hereinafter.

Figure 1:
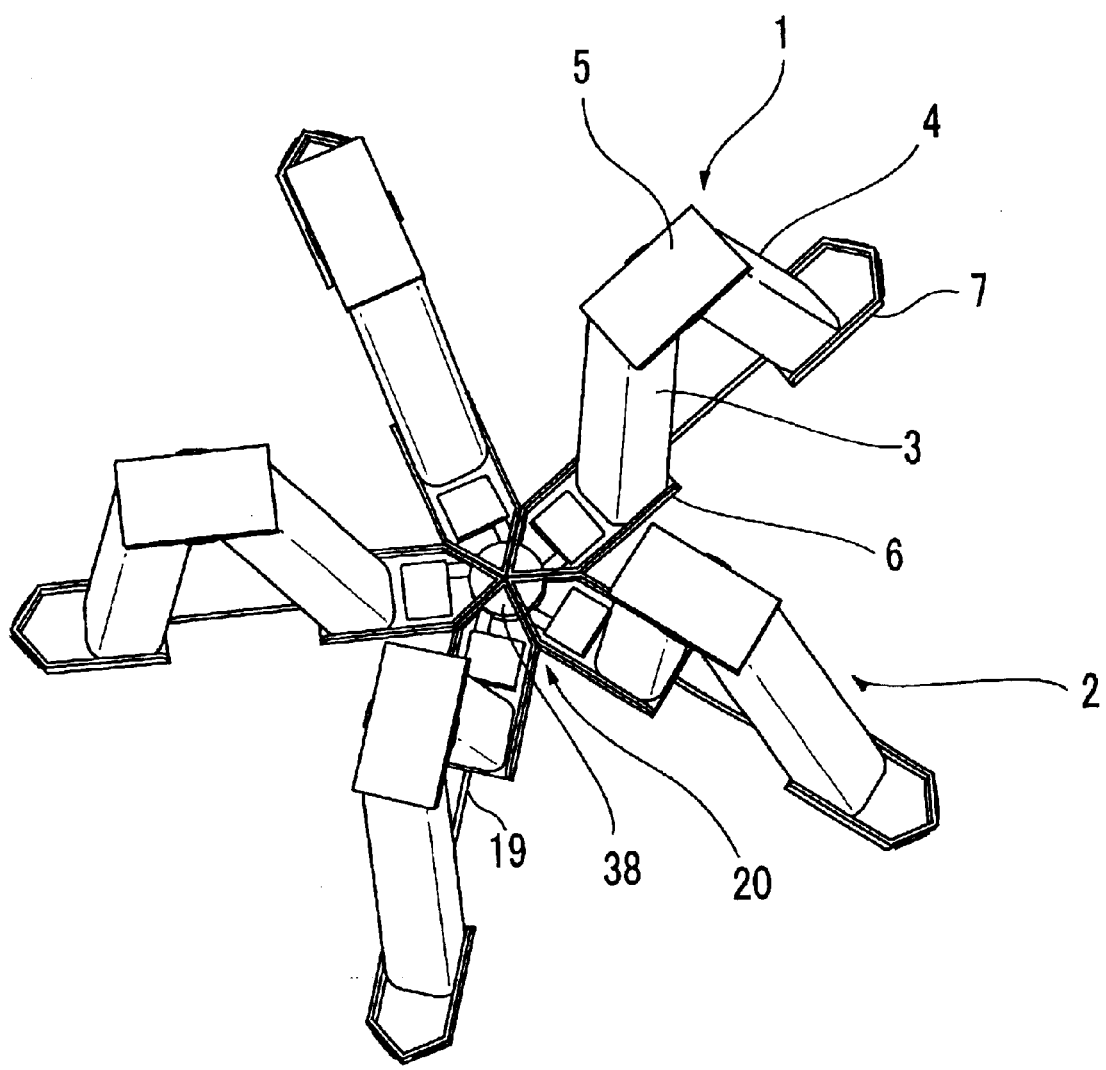
FIG. 1 is a perspective view showing a structural unit of an embodiment of the present invention.

Referring to FIG. 1, structural unit 1 in an embodiment of the present invention is shown. The structural unit 1 is constituted unfoldably by connecting five arm units 2 radially. The structural unit forms a frame of a pentagonal pyramid configuration when it is in an unfolded state.

Figure 2:
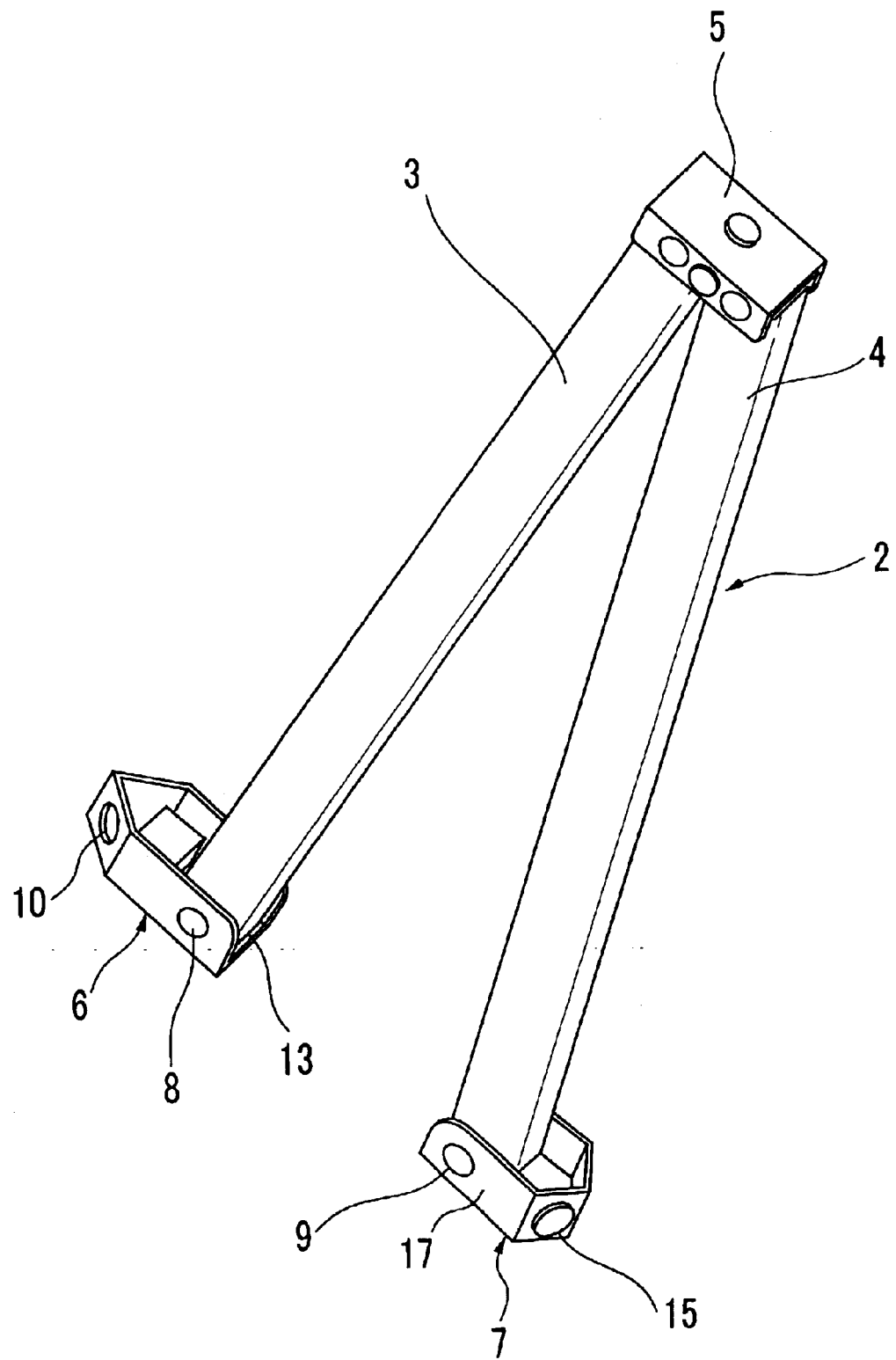
FIG. 2 is a perspective view showing an arm unit of an embodiment of the present invention.

Referring to FIG. 2, arm unit 2 is shown. The arm unit 2 includes elongated inner arm member 3 having first and second ends, outer arm member 4 having first and second ends, elbow joint mechanism 5 movably connecting the first end of inner arm member 3 to the first end of outer arm member 4, shoulder joint mechanism 6 movably connected to the second end of inner arm member 3, and wrist joint mechanism 7 movably connected to the second end of outer arm member 4. The elbow joint mechanism 5 is provided with a spring mechanism (not shown) which has enough torque to set an interior angle between inner arm member 3 and outer arm member 4 (hereinafter called "an elbow joint angle") to 180°. Boss parts 8, 9 having a flattened cylindrical shape project from the second ends of inner arm member 3 and outer arm member 4.

Figure 3:
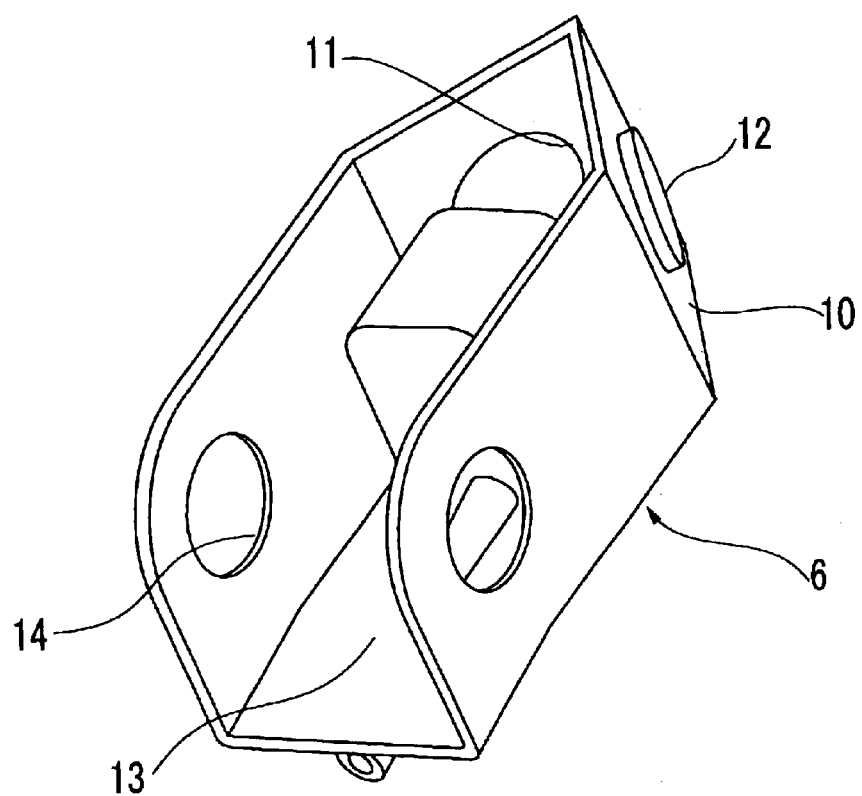
FIG. 3 is a perspective view showing a shoulder joint mechanism of an embodiment of the present invention.

Referring to FIG. 3, in shoulder joint mechanism 6, connecting end 10 having bow shape and a predetermined tip angle, such as 72° is formed, and each of the both sides thereof has circular connecting opening 11 and flattened cylindrical shape projecting part 12. Each projecting part 12 is formed so that it is engagable with corresponding connecting opening 11. Five arm units 2 are connected radially through their respective shoulder joint mechanism 6 by such engagements. In addition, in shoulder joint mechanism 6, engaging part 13 to which the second end of inner arm member 3 can engage is formed. Each of both sides of engaging part 13 has a round opening 14. The boss part 8 of inner arm member 3 is formed engagably to round opening 14, and thus shoulder joint mechanism 6 is supported by inner arm member 3.

Figure 4:
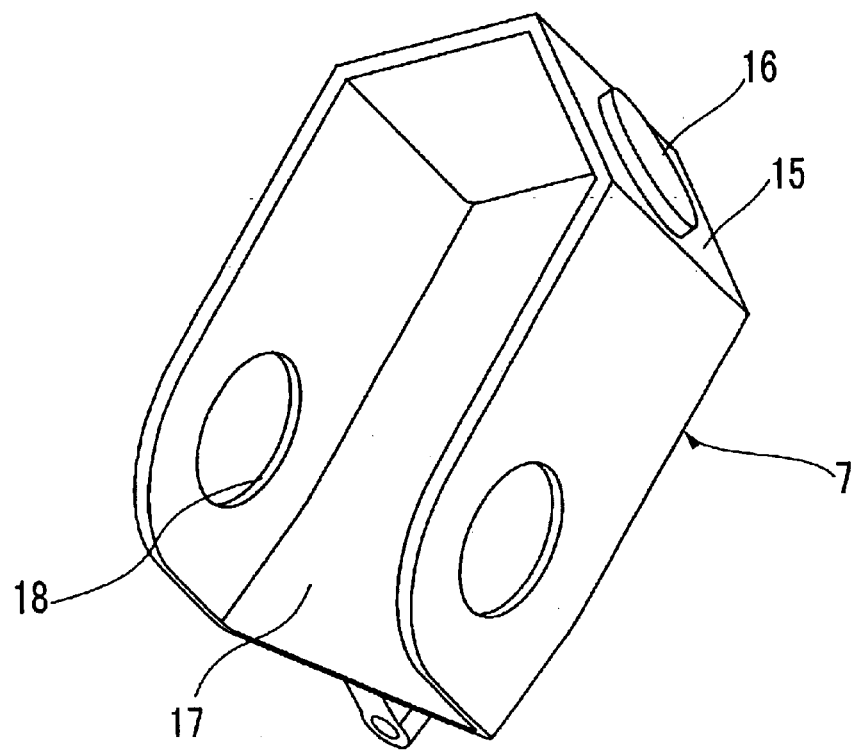
FIG. 4 is a perspective view showing a wrist joint mechanism of an embodiment of the present invention.

Referring to FIG. 4, in wrist joint mechanism 7, connecting end 15 having bow shape and a predetermined tip angle is formed, and each of the both sides thereof has flattened cylindrical shape projecting part 16. In addition, in wrist joint mechanism 7, engaging part 17 to which the second end of outer arm member 4 can engage is formed. Each of both sides of engaging part 17 has a round opening 18. The boss part 9 of outer arm member 4 is formed engagably to round opening 18, and thus wrist joint mechanism 7 is supported by outer arm member 4.

Figure 5:
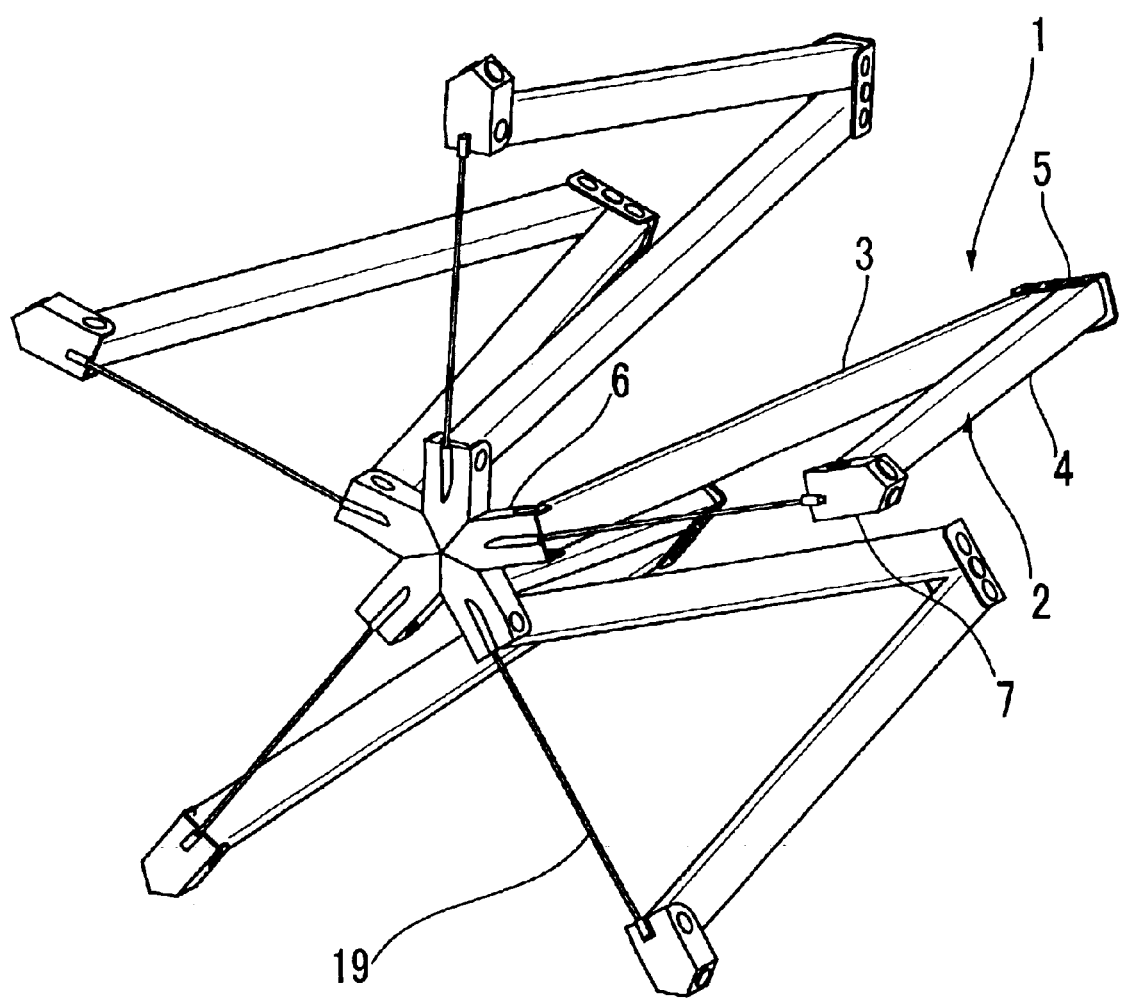
FIG. 5 is a perspective view showing a structural unit of an embodiment of the present invention.

Referring to FIG. 5, it is preferred that first wire 19 is spanned between shoulder joint mechanism 6 and wrist joint mechanism 7. In addition, as shown in FIG. 1, first wire adjusting mechanism 20 is provided to each shoulder joint mechanism 6. The first wire adjusting mechanism 20 has a mechanism 38 for winding first wire 19, and the length of first wire 19 between shoulder joint mechanism 6 and wrist joint mechanism 7 is adjusted by first wire adjusting mechanism 20.

Figure 6:
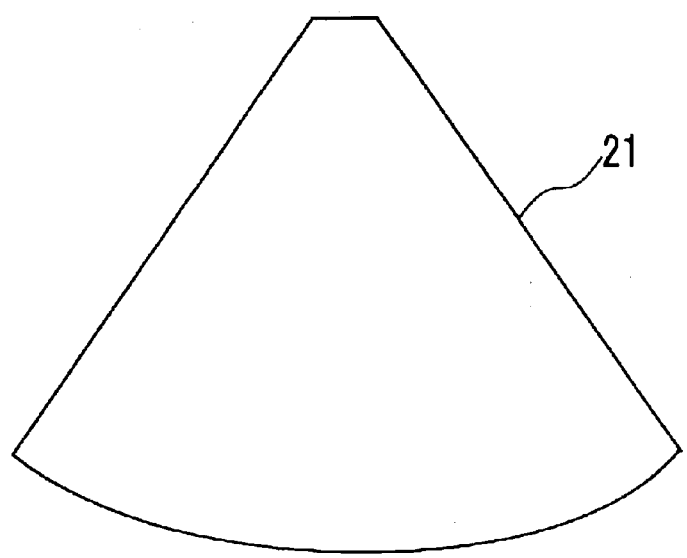
FIG. 6 is a plane view showing an inner membranous member of an embodiment of the present invention.
Figure 7:
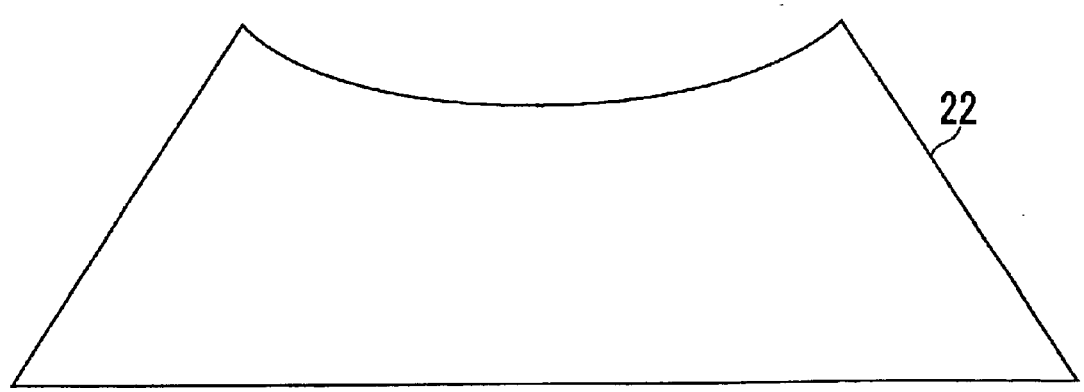
FIG. 7 is a plane view showing an outer membranous member of an embodiment of the present invention.
Figure 8:
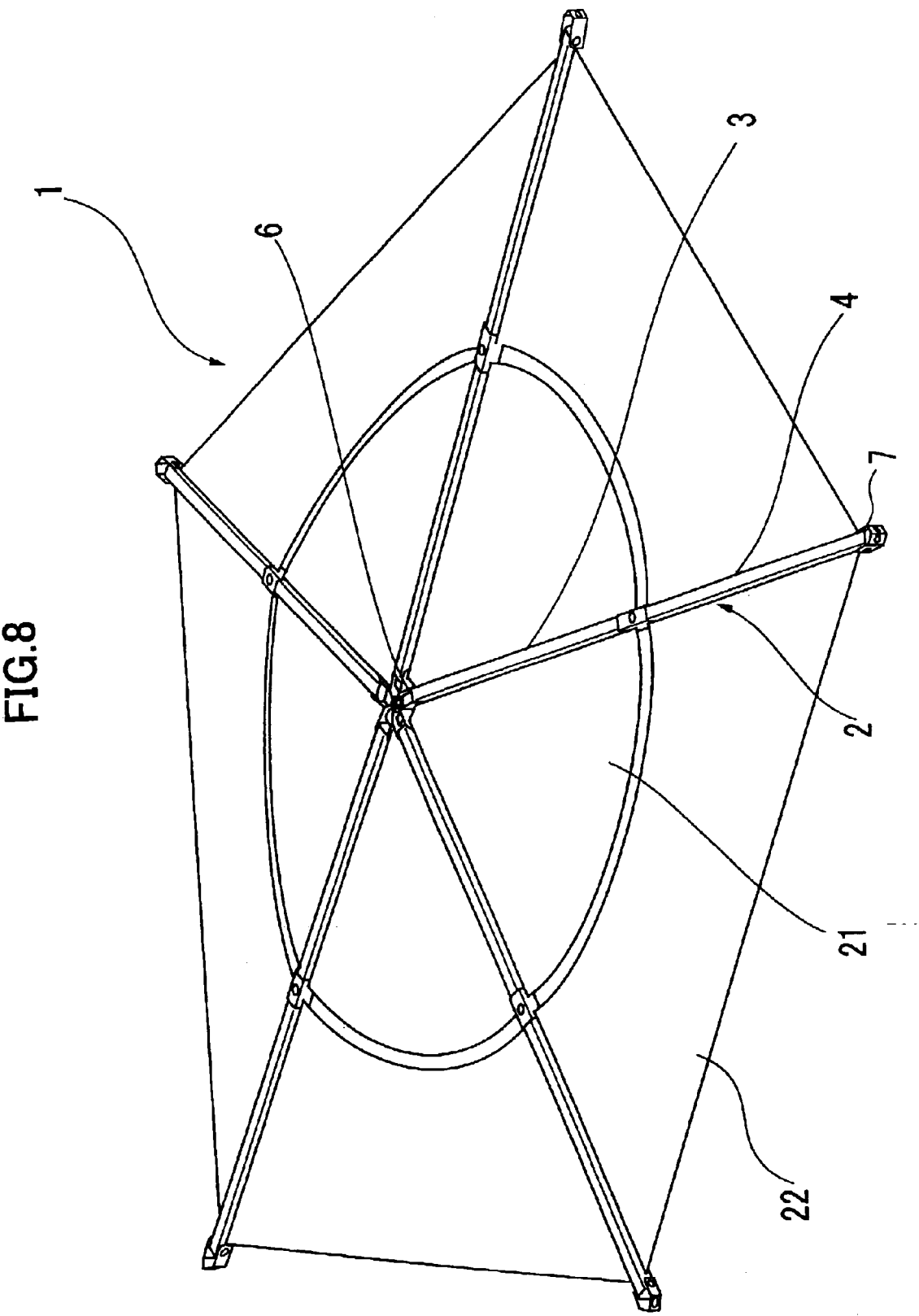
FIG. 8 is a perspective view showing an unfolded state of a structural unit of an embodiment of the present invention.

Referring to FIG. 6, inner membranous member 21 having an arc shape is provided between inner arm members 3 adjacent to each other. On the other hand, referring to FIG. 7, outer membranous member 22 of approximate trapeziform having a concave ceiling is provided between outer arm members 4 adjacent to each other. Each of inner and the outer membranous members 21, 22 is folded between inner and outer arm members 3, 4, respectively as structural unit 1 is folded, and is unfolded as structural unit 1 is unfolded. Referring to FIG. 8, in the unfolded state, structural unit 1 forms an umbrella having a pentagonal pyramid configuration. As such, since structural unit 1 forms a pentagonal pyramid configuration with a projecting center in its unfolded state, it has an improved rigidity. Maximum rigidity is obtained when an angle between a diagonal edge and a base of the pentagonal pyramid (sweptback angle)is about 10°.

Figure 9:
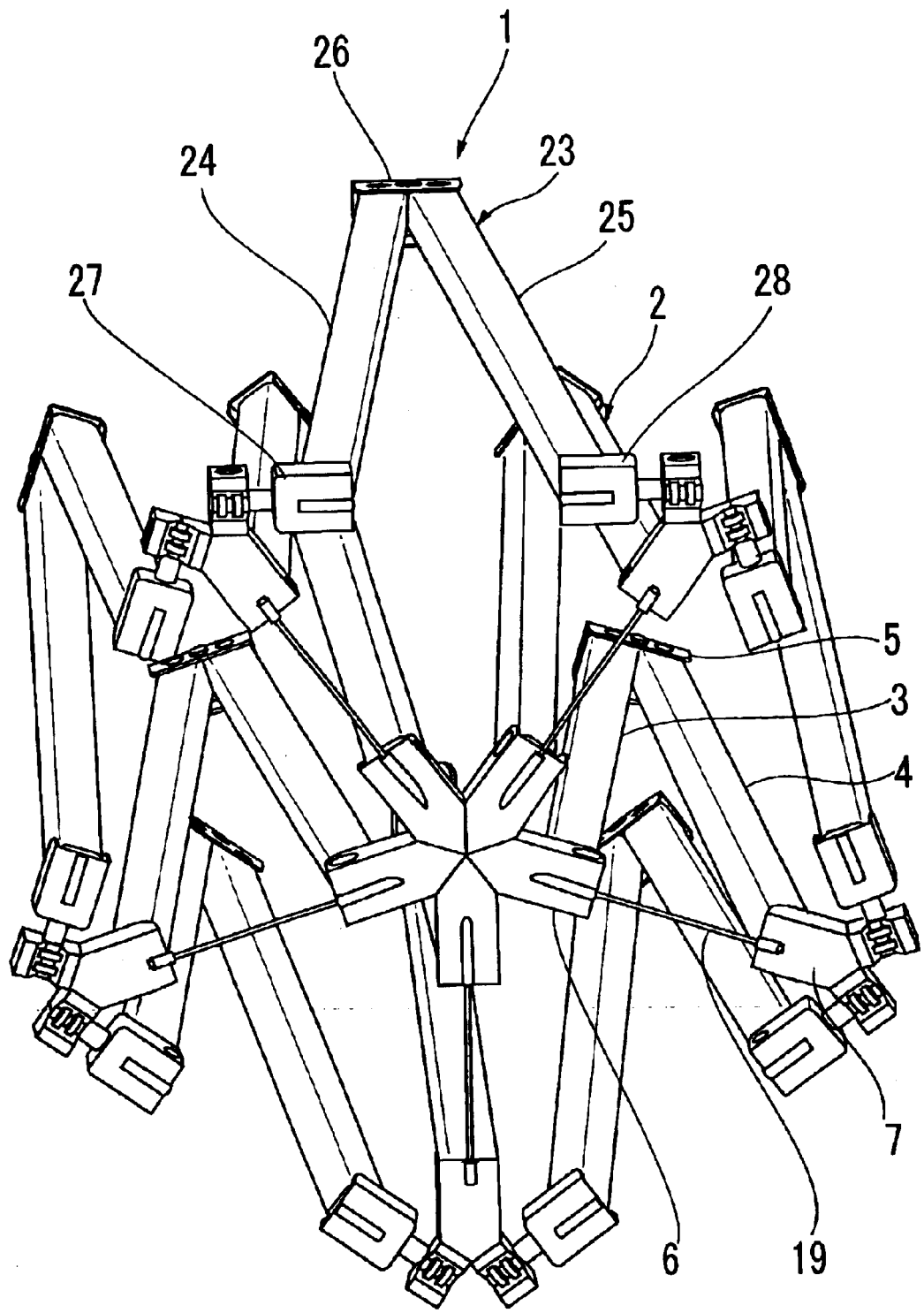
FIG. 9 is a perspective view showing a structural unit having a connecting arm unit of an embodiment of the present invention.
Figure 10:
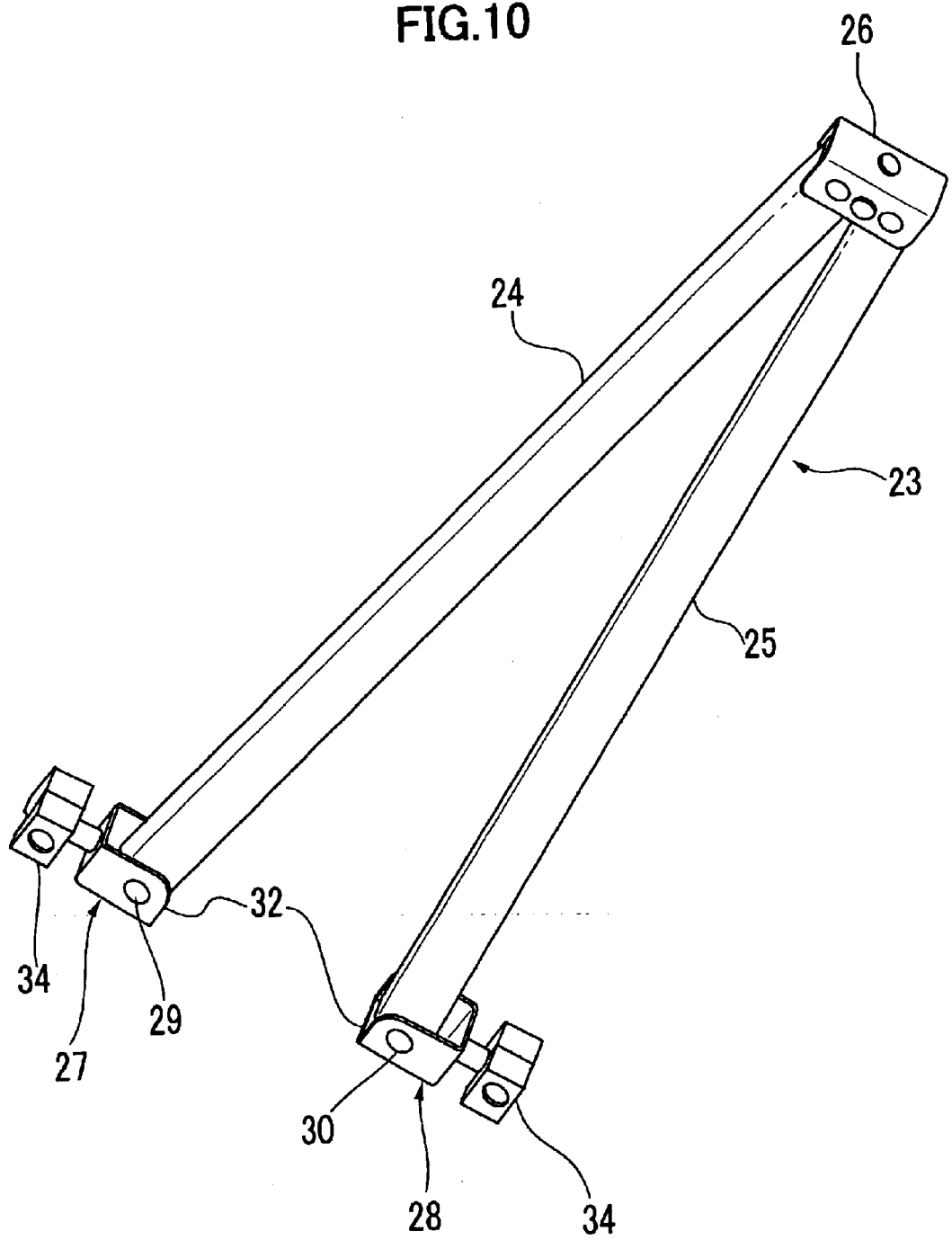
FIG. 10 is a perspective view showing a connecting arm unit of an embodiment of the present invention.

Referring to FIG. 9, it is preferred that each pair of adjoining wrist joint mechanisms 7 of five arm units 2 are provided with connecting arm unit 23. Referring to FIG. 10, connecting arm unit 23 contains left arm member 24 having first and second ends, right arm member 25 having first and second ends, elbow joint mechanism 26 movably connecting the first end of left arm member 24 to the first end of right arm member 25, left connecting mechanism 27 movably connecting the second end of left arm member 24 to the wrist joint mechanism connected to the second end of the outer arm member of one of the five arm units, and right connecting mechanism 28 movably connecting the second end of the right arm member 25 to the wrist joint mechanism connected to the second end of the outer arm member of another arm units adjacent to the one arm unit. The elbow joint mechanism 26 is provided with a spring mechanism (not shown) which has enough torque to set an interior angle between left arm member 24 and right arm member 25

(hereinafter called "an elbow joint angle") to 180°. Boss parts 29, 30 having a flattened cylindrical shape project from the second ends of left arm member 24 and right arm member 25.

Figure 11:
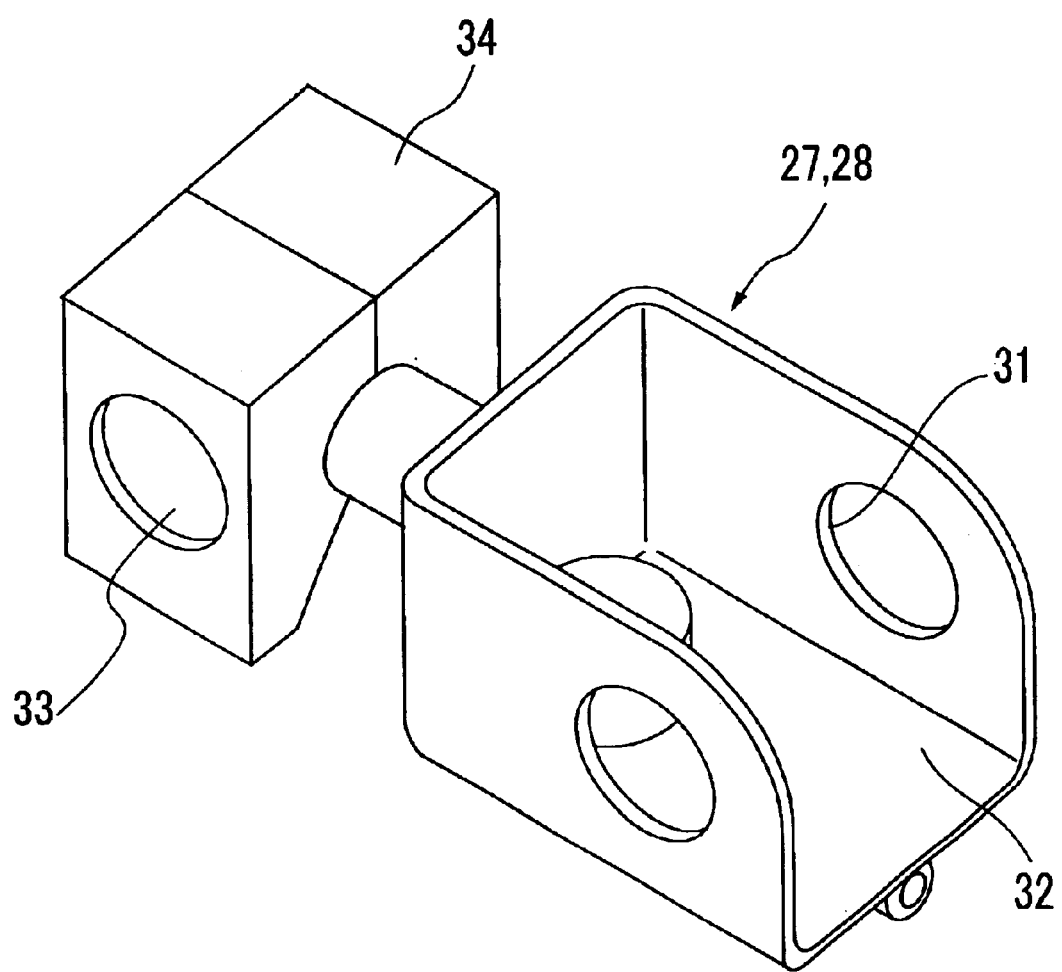
FIG. 11 is a perspective view showing left and right connecting mechanisms of an embodiment of the present invention.

Referring to FIG. 11, left and right connecting mechanisms 27, 28 have engaging part 32, both sides of which have circular opening 31. The boss parts 29, 30 of left and right connecting mechanisms 27, 28 engage with circular opening 31, and thus left and right connecting mechanisms 27, 28 are supported by left and right arm member 24, 25. In addition, left and right connecting mechanisms 27, 28 have connecting part 34, both sides of which have recess part 33. The projecting parts 16 of wrist joint mechanism 7 engage with recess part 33, and thus connecting arm unit 23 is connected to arm unit 2.

Figure 12:
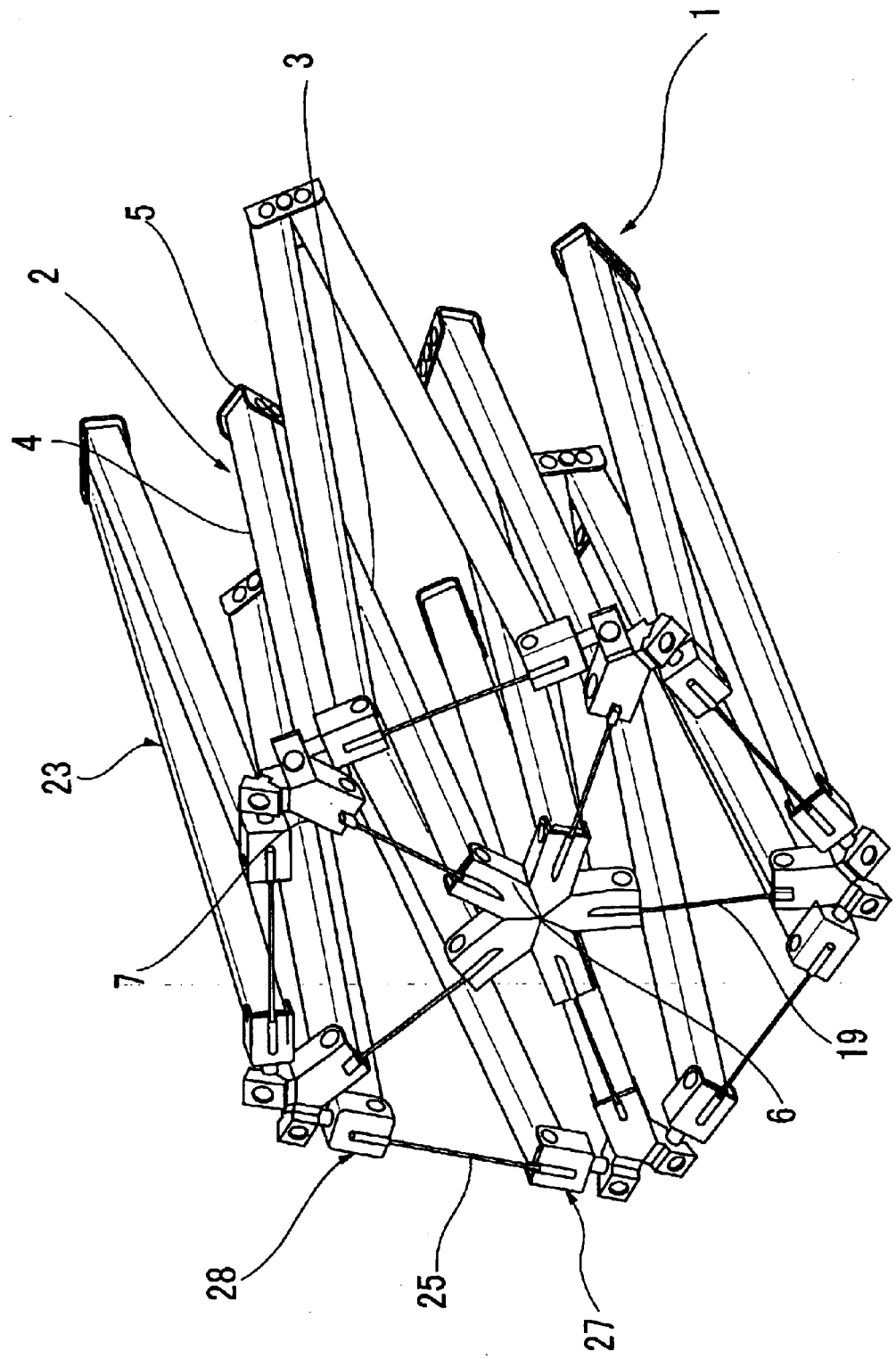
FIG. 12 is a perspective view showing a structural unit having a connecting arm unit of an embodiment of the present invention.
Figure 13:
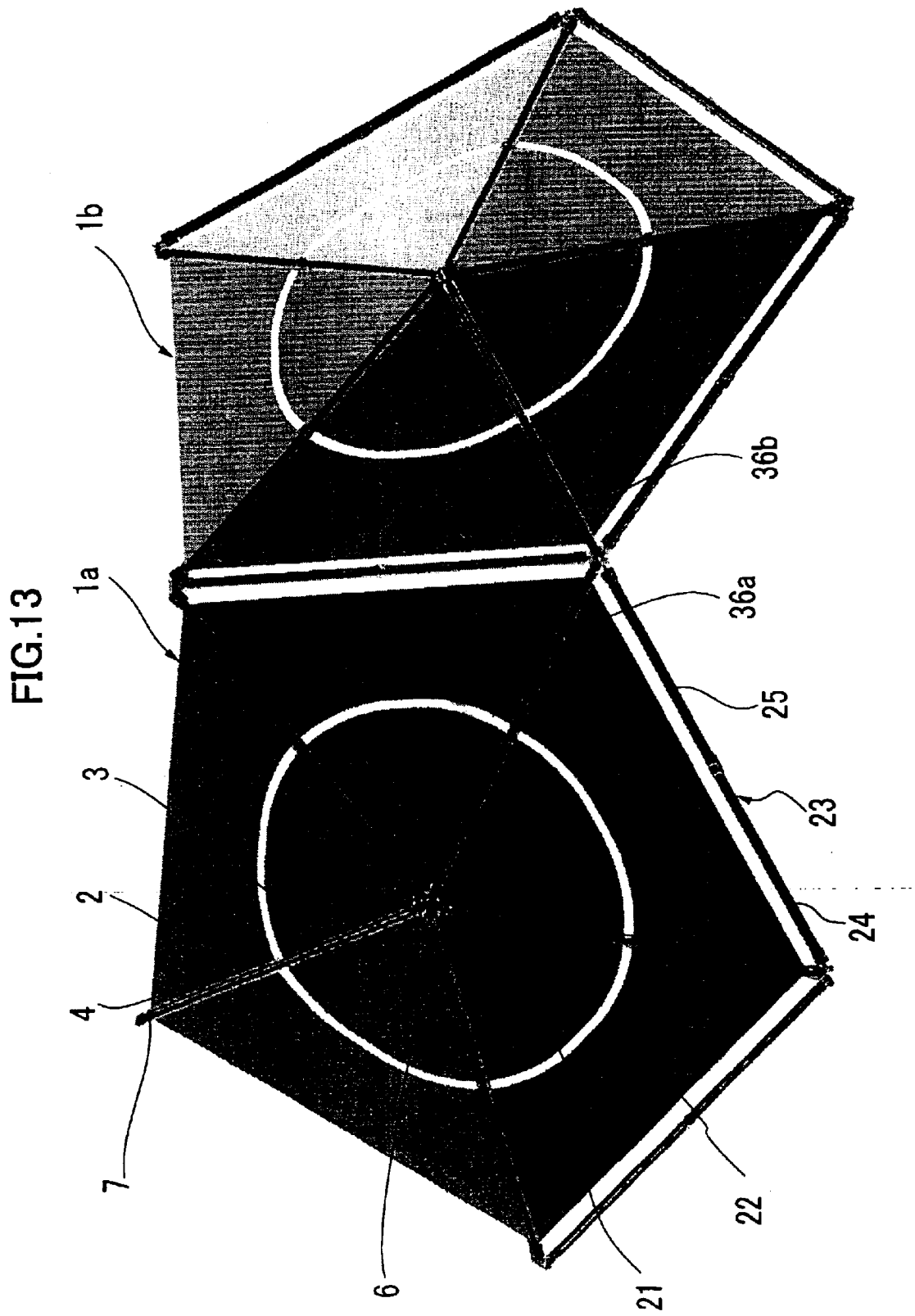
FIG. 13 is a perspective view showing an unfolded state of two connected structural units of an embodiment of the present invention.

Referring to FIG. 12, it is preferred that second wire 35 is spanned between left connecting mechanism 27 and right connecting mechanism 28 and the length of second wire 35 between left connecting mechanism 27 and right connecting mechanism 28 is adjusted by second wire adjusting mechanism (not shown). In addition, left connecting mechanism 27 and right connecting mechanism 28 are provided with a rotation mechanism (not shown) which has an enough torque to rotate up to a predetermined angle.

Referring to 13, two structural units 1a, 1b are connected to each other and then unfolded. It is preferred that an interior angle between a triangular plane 36a formed by a pair of wrist joint mechanisms 7 and the center of structural unit 1 and a triangular plane 36b which is on the opposite structural unit 1b and is adjacent to triangular plane 36a (hereinafter called "connection angle") is a predetermined angle, preferably 116.565°. In this regard, it is preferred that wrist joint mechanism 7 is provided with a rotation mechanism (not shown) which has an enough torque to rotate two structural units 1a, 1b up to this angle.

Figure 14:
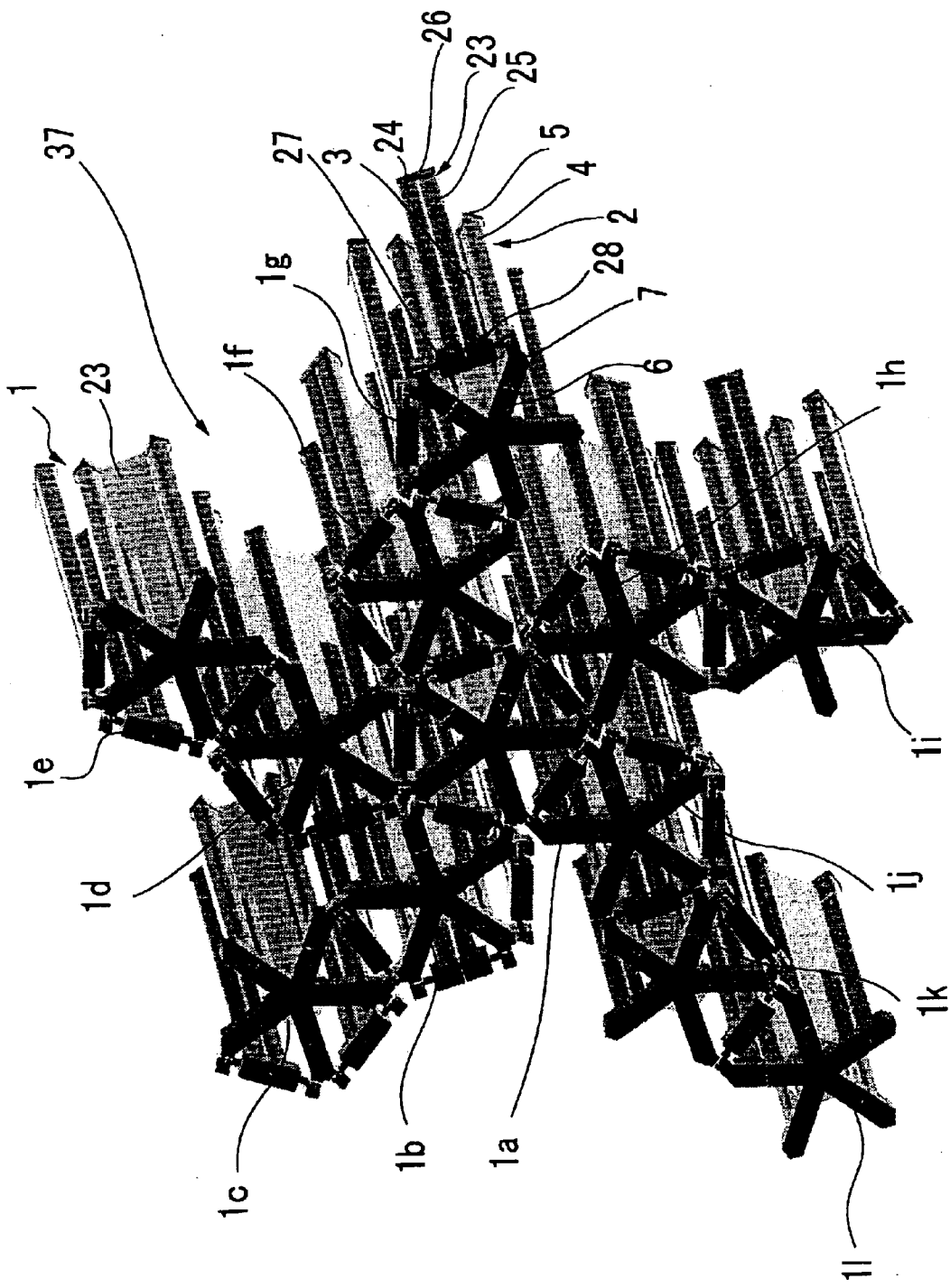
FIG. 14 is a perspective view showing a folded state of a shell-shape dodecahedron of an embodiment of the present invention.
Figure 15:
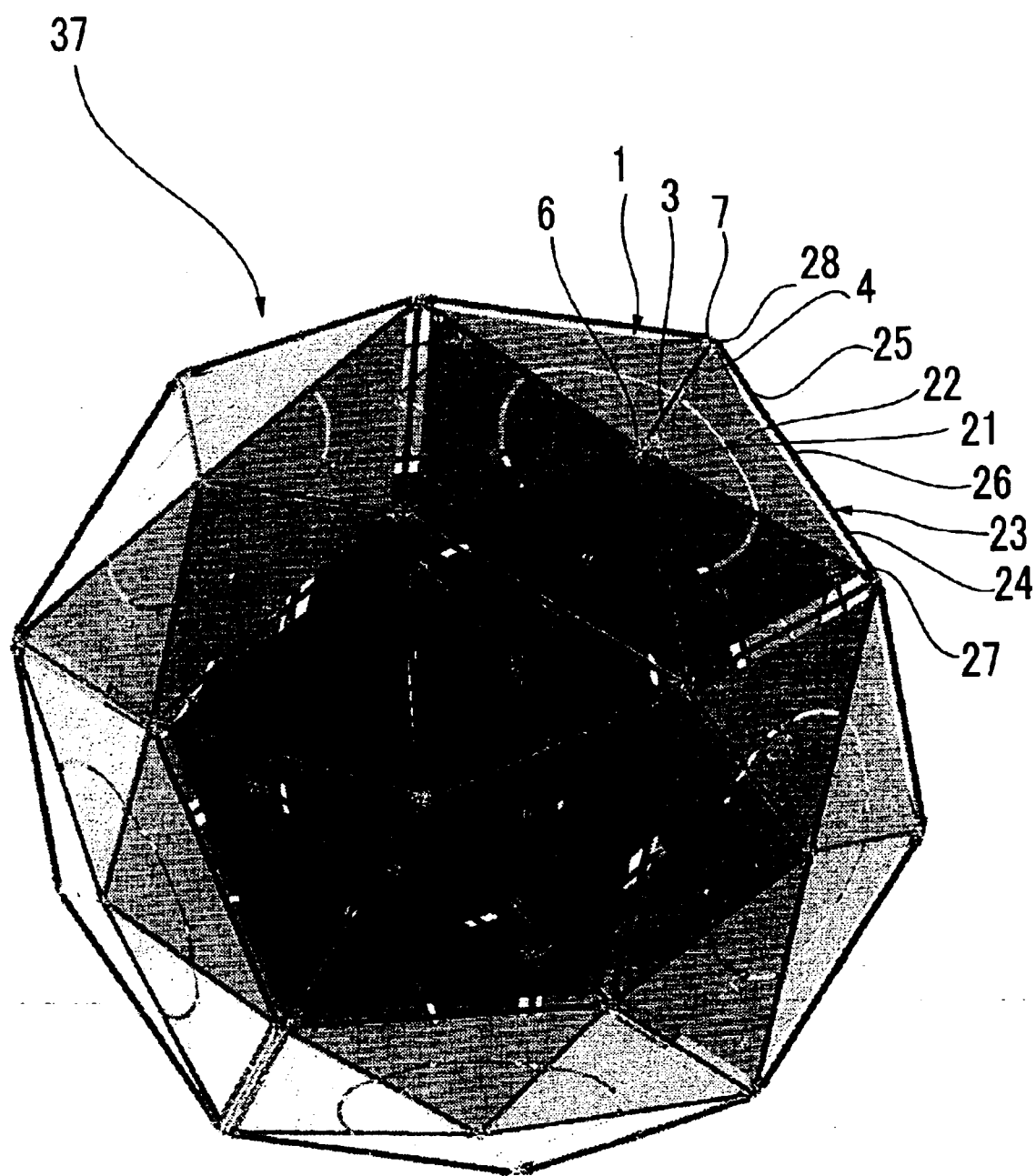
FIG. 15 is a perspective view showing an unfolded state of a shell-shape dodecahedron of an embodiment of the present invention.

Referring to FIGS. 14 and 15, a shell-shape dodecahedron 37 which contains twelve structural units 1a, 1b, 1c, 1d, 1e, 1f, 1g, 1h, 1i, 1j, 1k, 1l and thirty connecting arm units 23 is shown. As shown in FIG. 15, shell-shape dodecahedron 37 forms sixty isosceles triangles on its outer surface in its unfolded state.

When shell-shape dodecahedron 37 is transported to a predetermined place in the aerospace, shell-shape dodecahedron 37 is folded such that the connection angle is 180° and each elbow joint angle of arm unit 2 and connecting arm unit 23 is 0°. It is preferred that the shell-shape dodecahedron is folded in a state such that twelve structural units 1a, 1b, 1c, 1d, 1e, 1f, 1g, 1h, 1i, 1j, 1k, 1l are connected to structural unit 1a disposed at the center radially in five directions, at least two in each of the directions, as shown in FIG. 14. When shell-shape dodecahedron 37 is unfolded in the aerospace, first of all, with maintaining each of the elbow angles of arm unit 2 and connecting arm unit 23 being set as 0°, the connection angle between each of structural units 1 is changed from 180° to 116.565° by using the rotation mechanism (not shown). Then, all unconnected parts between wrist joint mechanism 7 and left or right connecting mechanism 27, 28 are connected. Next, with maintaining the connecting angle as 116.565°, each of the elbow angles is changed from 0° to 180° by using first wire adjusting mechanism 20 and the second wire adjusting mechanism (not shown). In this case, the lengths of first and second wires 19, 35 are adjusted so that all the elbow angles of the arm units and the connecting arm units are changing with being equal to each other. In this way, it is achieved to carry out smooth unfolding with avoiding interaction among structural units 1a, 1b, 1c, 1d, 1e, 1f, 1g, 1h, 1i, 1j, 1k, 1l. Furthermore, as shown in FIG. 15, since surface of shell-shape dodecahedron 37 has an outer surface fully covered by inner membranous member 21 and outer membranous member 22 in its unfolded state, and has no void formed on its outer surface, it has improved structural strength. In this connection, it is preferred to carryout the unfolding sequentially from structural unit 1 closest to the center, so that the unfolding can be carry out easily and surely.

Although explanation has been made for forming shell-shape dodecahedron 37 by connecting twelve structural units 1 radially in the above-described embodiments, the number of structural units to be connected and the shape of connection are not limited to these cases, but are changeable to various alternatives.

While the lengths of first and second wires 19, 35 are adjusted for unfolding shell-shape dodecahedron 37 in the above-described embodiments, it works even the length of the first wire is solely adjusted by first wire adjusting mechanism 20. Furthermore, instead of adjusting the length of the wire, the span between shoulder joint mechanism 6 and wrist joint mechanism 7 or between left connecting mechanism 27 and right connecting mechanism 28 can be adjusted by using other adjusting means, such as means for adjusting the elbow angle.

As described above, the present invention provides an unfoldable connected structure which forms no void at its outer surface when it is in an unfolded state, has improved structural strength, and allows smooth folding and unfolding action.

What is claimed is:

1. An unfoldable connected structure comprising:
   a structural unit movable in a folded and an unfolded state, said structural unit including
      five arm units, each of said arm units including
         an inner arm member having first and second ends,
         an outer arm member having first and second ends,
         an elbow joint mechanism movably connecting the first end of said inner arm member to the first end of said outer arm member,
         a shoulder joint mechanism movably connected to the second end of said inner arm member, and
         a wrist joint mechanism movably connected to the second end of said outer arm member; and
   means for connecting the arm units radially through their respective shoulder joint mechanism to form a frame of a pentagonal pyramid configuration when the structural unit is in an unfolded state.

2. The unfoldable connected structure according to claim 1, wherein the unfoldable connected structure further comprises:
   an extension mechanism for setting an elbow joint angle between said inner arm member and said outer arm member to 180°;
   a rotation mechanism for setting a connection angle of said structural unit to a predetermined angle;
   a wire spanned between said shoulder joint mechanism and said wrist joint mechanism; and
   a wire-adjusting mechanism for adjusting a length of the wire between the shoulder joint mechanism and the wrist joint mechanism.

3. The unfoldable connected structure according to claim 1, wherein the unfoldable connected structure further comprises:
   an inner membranous member provided between said inner arm members adjacent to each other;

an outer membranous member provided between said outer arm members adjacent to each other; and the inner and the outer membranous members being unfolded as said structural unit is unfolded and being spread between the inner and the outer arm members.

4. The unfoldable connected structure according to claim 1, wherein the unfoldable connected structure further comprises:

a connecting arm unit containing a left arm member having first and second ends, a right arm member having first and second ends, an elbow joint mechanism movably connecting the first end of said left arm member to the first end of said right arm member, a left connecting mechanism movably connecting the second end of said left arm member to said wrist joint mechanism connected to the second end of the outer arm member of one of said five arm units, and a right connecting mechanism movably connecting the second end of said right arm member to said wrist joint mechanism connected to the second end of the outer arm member of another arm units adjacent to said one arm unit.

5. An unfoldable connected structure comprising:

a structural unit movable in a folded and an unfolded state, said structural unit including five arm units, each of said arm units including an inner arm member having first and second ends, an outer arm member having first and second ends, an elbow joint mechanism movably connecting the first end of said inner arm member to the first end of said outer arm member, a shoulder joint mechanism movably connected to the second end of said inner arm member, and a wrist joint mechanism movably connected to the second end of said outer arm member;

means for connecting the arm units radially through their respective shoulder joint mechanism to form a frame of a pentagonal pyramid configuration when the structural unit is in an unfolded state;

an extension mechanism for setting an elbow joint angle between said inner arm member and said outer arm member to 180°;

a rotation mechanism for setting a connection angle of said structural unit to a predetermined angle;

a wire spanned between said shoulder joint mechanism and said wrist joint mechanism;

a wire-adjusting mechanism for adjusting a length of the wire between the shoulder joint mechanism and the wrist joint mechanism;

an inner membranous member provided between said inner arm members adjacent to each other;

an outer membranous member provided between said outer arm members adjacent to each other;

the inner and the outer membranous members being unfolded as said structural unit is unfolded and being spread between the inner and the outer arm members;

a connecting arm unit containing a left arm member having first and second ends, a right arm member having first and second ends, an elbow joint mechanism movably connecting the first end of said left arm member to the first end of said right arm member, a left connecting mechanism movably connecting the second end of said left arm member to said wrist joint mechanism connected to the second end of the outer arm member of one of said five arm units;

a right connecting mechanism movably connecting the second end of said right arm member to said wrist joint mechanism connected to the second end of the outer arm member of another arm units adjacent to said one arm unit;

an extension mechanism provided to the elbow joint mechanism for setting an elbow joint angle between said inner arm member and said outer arm member to 180°;

a rotation mechanism for setting a connection angle of said left connecting mechanism and said right connecting mechanism to a predetermined angle;

a wire spanned between the left connecting mechanism and the right connecting mechanism; and a wire-adjusting mechanism for adjusting a length of the wire between the left connecting mechanism and the right connecting mechanism.

6. The unfoldable connected structure according to claim 5, wherein said structural unit has a sweptback angle of about 10°.

7. The unfoldable connected structure according to claim 6, wherein the unfoldable connected structure comprises twelve of said structural units connected, and forming a shell-shape dodecahedron.

8. The unfoldable connected structure according to claim 7, wherein the unfoldable connected structure further comprises:

additional structural units radially connected in five directions to the structural unit disposed in the center;

when the unfoldable connected structure is folded, each of the elbow angles of said arm unit and said connecting arm unit being set to 0° and the connection angle between each of the structural units being set to 180°; and when the unfoldable connected structure is unfolded, each of the elbow angles of said arm unit and said connecting arm unit being set to 180° and the connection angle being set to 116.565°.

* * * * *